United States Patent [19]

Narasimhan

[11] Patent Number: 5,574,665
[45] Date of Patent: Nov. 12, 1996

[54] RECEIVER APPARATUS AND METHOD FOR FREQUENCY TAGGING

[75] Inventor: Anand Narasimhan, New York, N.Y.

[73] Assignee: International Business Machines Corporation, Armonk, N.Y.

[21] Appl. No.: 235,447

[22] Filed: Apr. 29, 1994

[51] Int. Cl.⁶ ................................................ G01S 15/00
[52] U.S. Cl. ................................. 364/517; 340/825.39
[58] Field of Search .................................. 340/572, 692, 340/825.39, 539, 825.34; 364/517; 342/44

[56] References Cited

U.S. PATENT DOCUMENTS

| | | |
|---|---|---|
| 3,169,242 | 3/1965 | Davis et al. . |
| 3,842,246 | 10/1974 | Kohler et al. ............................ 340/572 |
| 4,274,089 | 6/1981 | Giles . |
| 4,646,090 | 2/1987 | Mawhinney . |
| 4,654,641 | 3/1987 | Ferguson et al. . |
| 4,814,751 | 3/1989 | Hawkins et al. . |
| 4,862,160 | 8/1989 | Ekchian et al. . |
| 5,001,458 | 3/1991 | Tyren et al. . |
| 5,083,113 | 1/1992 | Slawinski et al. . |
| 5,235,326 | 8/1993 | Beigel et al. ............................ 340/572 |
| 5,239,284 | 8/1993 | Hara et al. ............................. 340/572 |
| 5,285,194 | 2/1994 | Ferguson ................................ 340/572 |

*Primary Examiner*—Ellis B. Ramirez
*Assistant Examiner*—Thomas Peeso
*Attorney, Agent, or Firm*—Louis J. Percello; Ronald L. Drumheller

[57] ABSTRACT

The present invention is a system and method for resolving closely spaced frequencies in frequency patterns used to tag objects. The system comprises a base station transceiver and one or more objects that send the base station a unique frequency pattern that identifies the respective object and/or provides information about the object. The base station performs a method by which an estimate of a received signal from an object is compared to one or more known frequency patterns in a frequency pattern set stored at the base station. One test frequency pattern at a time is selected and a distance is determined between the estimated received frequency pattern and the selected test frequency pattern. Iterative modifications are done to the test frequency pattern to minimize the distance. If the distance can be reduced to within a selected threshold, a known frequency pattern stored in the frequency pattern set at the base station and closest to the modified test frequency pattern is chosen as the frequency pattern transmitted by the object. The invention includes a method for determining and removing indeterministic noise.

5 Claims, 6 Drawing Sheets

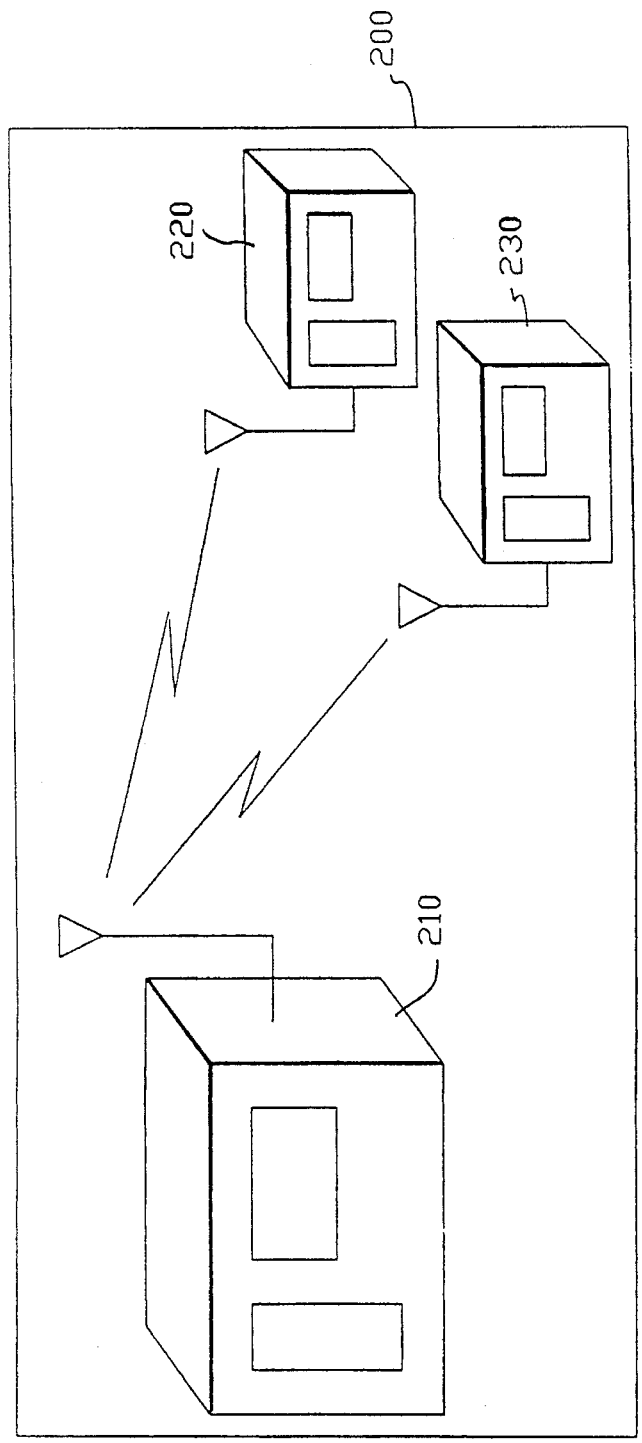
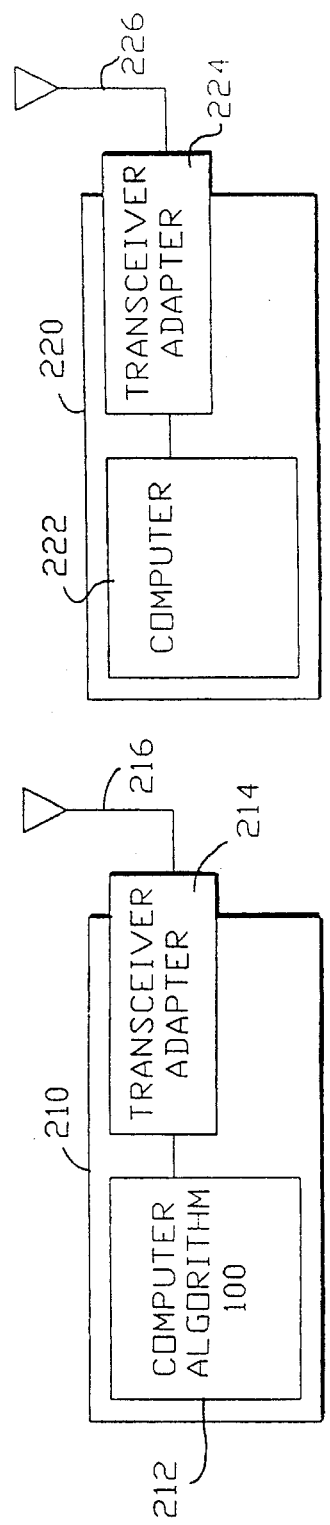
FIG. 2a
FIG. 2b

F I G. 5
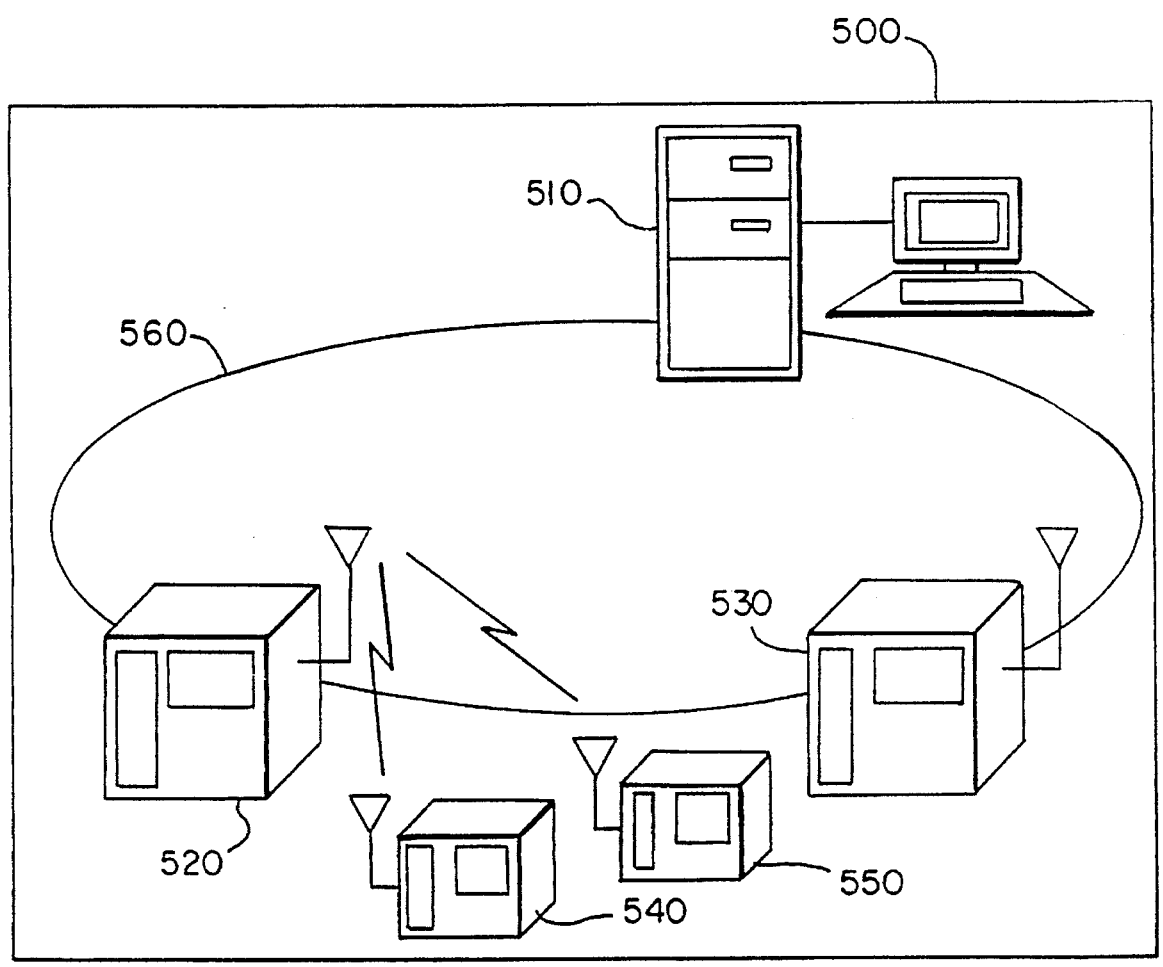

RECEIVER APPARATUS AND METHOD FOR FREQUENCY TAGGING

FIELD OF THE INVENTION

This invention is an improved system and method for identifying one or more objects from a frequency pattern uniquely associated with each object. More specifically, the invention identifies each of a plurality of objects from a frequency pattern tag associated with the respective object where each frequency pattern consists of a unique set of closely spaced frequencies.

BACKGROUND OF THE INVENTION

Many applications require that objects be "tagged" so that the object can be identified or so that information about the object can be provided to a data acquisition system. One type of tagging is the use of bar codes on objects. Bar coding of objects, e.g. for identifying objects in a retail check out line, is well known. However, the use of bar codes requires a code reader at close proximity, and very often, the presence or assistance of a human being. Accordingly there is a growing need for devices that can operate over larger distances, and where the identification process can be entirely automated.

The prior art discloses objects being tagged with unique frequencies or unique frequency patterns for purposes of identification. In this type of tagging, called frequency tagging, the object would have a type of transmitter that would send a frequency signal to a remote receiver. The receiver uses the signal and/or the frequency or frequency pattern of the signal to identify the object and/or obtain information about the object. These applications of frequency tagging may involve, for instance, applications that require tagging of objects in stores, for purposes of sales and inventory, or applications for identifying automobiles on a toll road at a toll stop for the purpose of collecting a toll.

In digital communication systems digital packet transmissions can be preceded by unique frequency tones so that the transmission medium may be characterized by determining a set of parameters that fully represent the effect of the medium upon the transmission. These parameters are typically determined prior to the actual data transmission and are used to filter the effects of the medium from the signal. This characterization is also called channel estimation, e.g., identification of the noise in the signal. Once identified, the noise can be removed.

Other applications of frequency tagging exist in magnetic recording, where pilot tones e.g., audio, frequencies are employed to provide position reference information in order to maintain a magnetic head over a track. One common choice of frequencies for tagging objects in the prior art are radio frequencies. The tagged object is fitted with an active or passive device that responds to a query from a transceiver. In a system using active device tags, the object has a device such as a transceiver that emits a unique set of radio frequency tones. In a system using passive device tags, the object has a device that may resonate at unique frequencies when queried by specific frequency tones. Alternatively, a passive device may have a uniquely shaped antenna that couples to the antenna of the interrogating source, and thereby conveys its information in a unique frequency tone. In any event, these frequencies must be uniquely identified and used to establish the identity of the queried object.

However, the prior art sometimes has problems in resolving frequency patterns, i.e., the prior art sometimes has problems identifying all the component frequencies of a frequency pattern. These problems particularly arise when the frequency patterns are made up of a set of frequencies that are very close together. Frequency patterns are also difficult to resolve if there is noise in the signal, especially if the noise is not deterministic. A noise is not deterministic, e.g., indeterministic, if the cause and/or structure of the noise are unknown. (Knowledge about the structure of noise includes a definition of the frequencies making up the noise, the amplitudes and phases of those frequencies, and the distribution of the frequencies.)

The prior art often try to resolve transmitted frequency patterns using methods based on Fourier techniques. However, these techniques cannot resolve frequency patterns well if the frequencies in the pattern are spaced closer than $1/N$, where N is the number of samples of the signal available. For example, if the number of samples of a signal is 100, the prior art can not distinguish between two frequencies spaced closer than 0.01 cycles per second. When the frequencies in the pattern are spaced this close or closer, the two frequencies appear as one to the receiver.

Many analog and digital systems in the prior art also fail to resolve frequency patterns with frequencies space closer than $1/N$ because of the closeness of the frequencies making up the pattern and the tuning limitations of the hardware.

To resolve a pattern of frequencies containing noise, the prior art uses a number of techniques that presuppose a certain noise background and describe methods for identifying frequencies embedded in these presupposed noise backgrounds. This process of noise estimation and the estimation of the location in frequency domain, of the unique frequency tones, together with estimation of the amplitude and phase content in the unique frequencies is usually termed channel estimation. However, channel estimation techniques fail to work well in the presence of indeterministic noise because most techniques are designed to filter an assumed noise structure and are inadequate to filter other noise structures.

OBJECTS OF THE INVENTION

An object of this invention is an improved system and method for analyzing frequency patterns of closely spaced frequencies used to tag objects.

Another object of this invention is an improved system and method for removing noise from frequency patterns of closely spaced frequencies that are analyzed to identify objects tagged with those frequency patterns.

A further object of this invention is ah improved system and method for removing indeterministic noise from frequency patterns of closely spaced frequencies that are analyzed to identify objects tagged with those frequency patterns.

SUMMARY OF THE INVENTION

The present invention is a system and method for resolving closely spaced frequencies in frequency patterns used to tag objects. The system comprises a base station transceiver and one or more objects that send the base station a unique frequency pattern that identifies the respective object and/or provides information about the object. The base station performs a method by which an estimate of a received signal from an object is compared to one or more known frequency patterns in a frequency pattern set stored at the base station.

One test frequency pattern at a time is selected and a distance is determined between the estimated received frequency pattern and the selected test frequency pattern. Iterative modifications are done to the test frequency pattern to minimize the distance. If the distance can be reduced to within a selected threshold, a known frequency pattern stored in the frequency pattern set at the base station and closest to the modified test frequency pattern is chosen as the frequency pattern transmitted by the object. The invention includes a method for determining and removing indeterministic noise.

BRIEF DESCRIPTION OF THE DRAWINGS

FIGS. 2(a) and 2(b) are block diagrams of a communication system comprising a base station and remote tagged objects (shown in FIG. 2a with details shown in 2b) using the present invention for radio frequency tagging.

FIG. 5 is a block diagram of a computer local area network (LAN) using the present invention for frequency tagging.

DETAILED DESCRIPTION OF THE INVENTION

Figure 1:
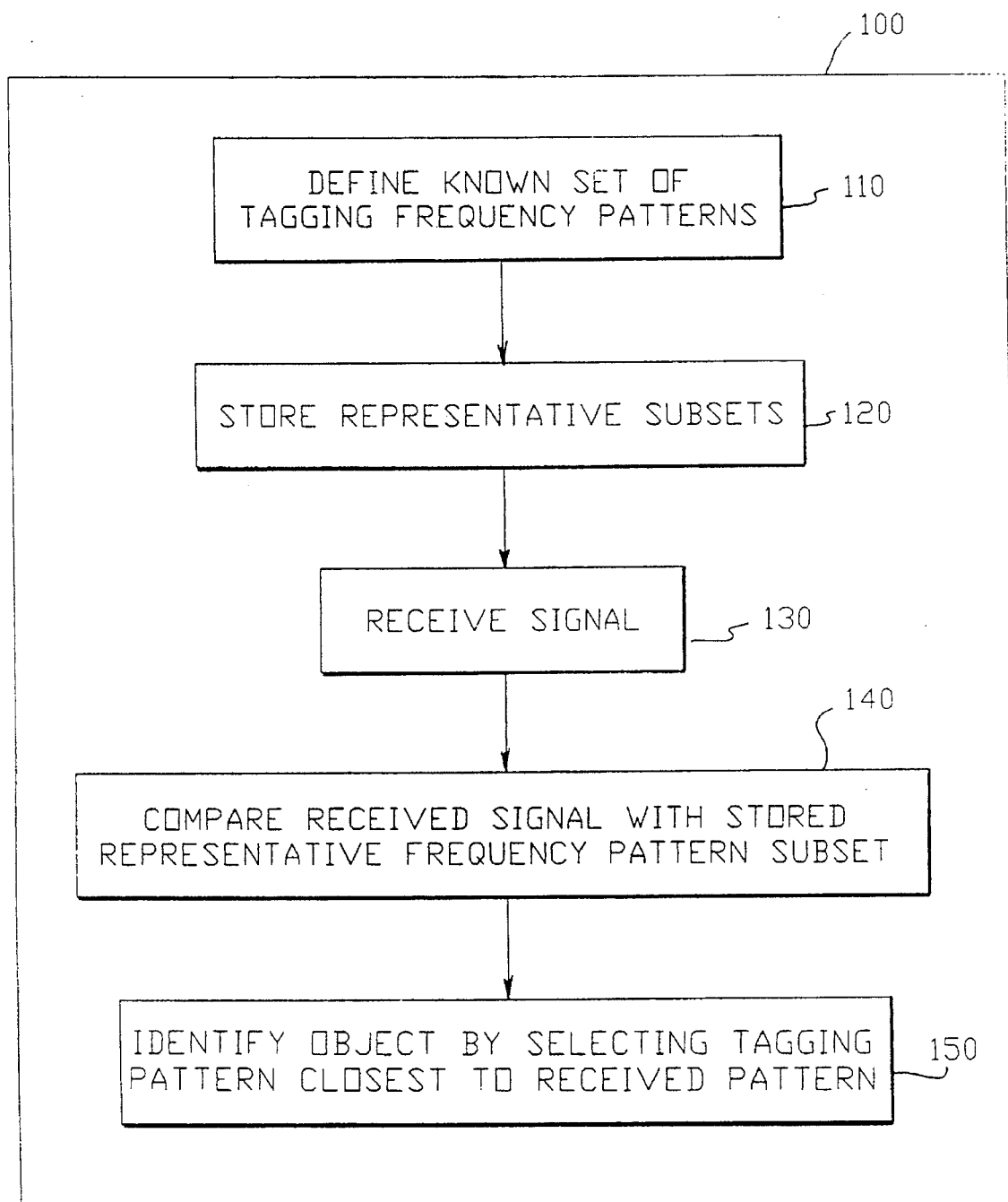
FIG. 1 is a flow chart showing the steps of a preferred general method of the present invention.

FIG. 1 is a flow chart of the present method 100 for resolving a known set of frequencies for each of a known get of frequency patterns. Each frequency pattern is transmitted from an object with which the respective frequency pattern is associated anti provides identity (and possibly other) information about its associated object. Using the method 100, the identity (and other) information about each object in an object set can be determined by resolving the frequency pattern associated with the object. Using this novel method 100, the frequency pattern of each object in the object set can be resolved even though the frequency set in a given frequency pattern comprises frequencies that are closely spaced and the frequency pattern contains indeterministic noise.

The method 100, begins by defining a known set of frequency patterns 110, called a frequency pattern set. The frequency patterns in the frequency pattern set are so chosen that each frequency pattern is uniquely distinguishable from every other frequency pattern chosen to be in the frequency pattern set.

In addition, the frequency spacing between adjacent frequencies in a frequency pattern is chosen to be sufficiently far apart so that the frequencies in the frequency pattern may be easily distinguishable. Note that the present invention permits the spacing of the frequencies in each of the frequency patterns to be less than 1/N, where N is the number of samples in the signal that comprises the frequency pattern. For example, if the number of samples is 100, the frequencies can be spaced between 0.01 cycles/second of one another. This feature of the present invention permits smaller bandwidths to be used. It also permits the use of more frequencies, i.e., more unique frequency patterns or tags for any given bandwidth available.

Consider, for example, a set of P frequencies, labelled as $1, 2, 3, \ldots, P$. Patterns of frequencies may be formed from this set of P frequencies, as $$\Omega_1 = \{1, 2, 3, 4, 5, \ldots P\}$$
$$\Omega_2 = \{2, 3, 4, 5, \ldots P, 1\}$$
$$\Omega_3 = \{3, 4, 5, \ldots P, 1, 2\}$$
$$*$$
$$*$$
$$*$$

In this example, each frequency pattern $\Omega$ uses the same set of frequencies, $\omega$ but the frequencies arc placed in a different order.

To describe this more formally, a frequency pattern set comprises Q number of frequency patterns $\Omega_1$ to $\Omega_Q$ where each frequency pattern $\Omega$ further comprises one or more frequencies $\omega$. Thus a first frequency pattern $\Omega_1$ comprises the frequencies $\omega_{11}, \omega_{21}, \ldots, \omega_{p1}$ where the frequency $\omega_{pq}$ is the frequency in the p th position in the q th frequency pattern $(\Omega_q)$. Therefore, the frequency pattern set comprises all Q of the frequency patterns $\Omega$ which accordingly include the following frequencies:

$$\Omega_1 = \omega_{11}, \omega_{21}, \ldots, \omega_{P1}$$
$$\Omega_2 = \omega_{12}, \omega_{22}, \ldots, \omega_{P2}$$
$$*$$
$$*$$
$$*$$
$$\Omega_Q = \omega_{1Q}, \omega_{2Q}, \ldots, \omega_{PQ}$$

An object, o, is tagged by uniquely assigning a frequency pattern $(\Omega_q)$ to each object, $o_q$. Therefore, each object, $o_q$, in a set of objects, $O_Q$, can be uniquely identified by the the frequency pattern $\Omega_q$ which is uniquely and respectively assigned to the object. Accordingly, each of the frequency patterns in the frequency pattern set is used to tag each of the objects in the object set, $O_Q$.

In box 110, the frequency patterns, $\Omega_Q$, are used to tag objects, o, in an object set $O_q$. There are many examples of objects known in the art that may be tagged in this manner. Further, the object tag can be used to provide information about the identity of the object and/or other information about the object. For instance, objects in grocery stores, like produce or package goods, may be tagged with information pertaining to their identity as well as price or other relevant information. Objects in warehouses, like crates, may be tagged for inventory purposes. In communication systems, objects, like remote transmitters, are assigned unique frequency patterns that serve as unique addresses that distinguish them from other communication devices. Also, in communication systems, these frequency patterns facilitate the process of channel estimation, and for extracting the desired signal from a noisy background.

FIG. 2 is a diagram of a tag identification system 200 that comprises two kinds of units. The first, 210 is a base station, which queries the remote tag objects, 220, 230. The base station 210 comprises a radio transceiver 214 and a computer 212 which performs the algorithm 100. Each remote tag 220, 230, comprises a radio transceiver 224 that can communicate with base station transceiver 214. In addition, it may contain a computer for assisting in the task of transmitting the tag's unique frequency pattern, in response to a query from the base station.

Once the frequency pattern set is defined in 110, and each object is tagged with a unique frequency pattern in the set, the representative subsets are stored 120. In the tag identification system 200 example shown in FIG. 2, the frequency patterns that comprise the pattern set are stored in the computer 212 of the base station 210.

In the next step in the process 130 a signal from the tagged object is received. In the tag identification system 200 example, the base station 210 first queries a remote object (e.g., 220, 230). Then remote object transmits its unique frequency pattern which is received by the base station 210. The base station 210 receives this signal through its antenna 216 and transceiver 214.

The queried object's received tag frequency is then compared in step 140 to one or more frequency patterns stored (e.g., in 212) during step 120. This comparison is repeated for each frequency pattern in the stored set until a stored frequency pattern closest to the received frequency pattern if found.

There are several ways in which frequency patterns can be compared. The simplest is by an exhaustive search, over all possible sets of frequency patterns. This method is quite inefficient. Other methods involve comparisons with frequency patterns from a subset of possible frequencies using different search schemes, for instance, using tree searches. There are other methods, for instance, gradient algorithms, which use the objective function J of algorithm 100 to arrive at the closest frequency pattern match, by using the received pattern itself, without performing an explicit comparison with the representative stored subset.

Figure 3:
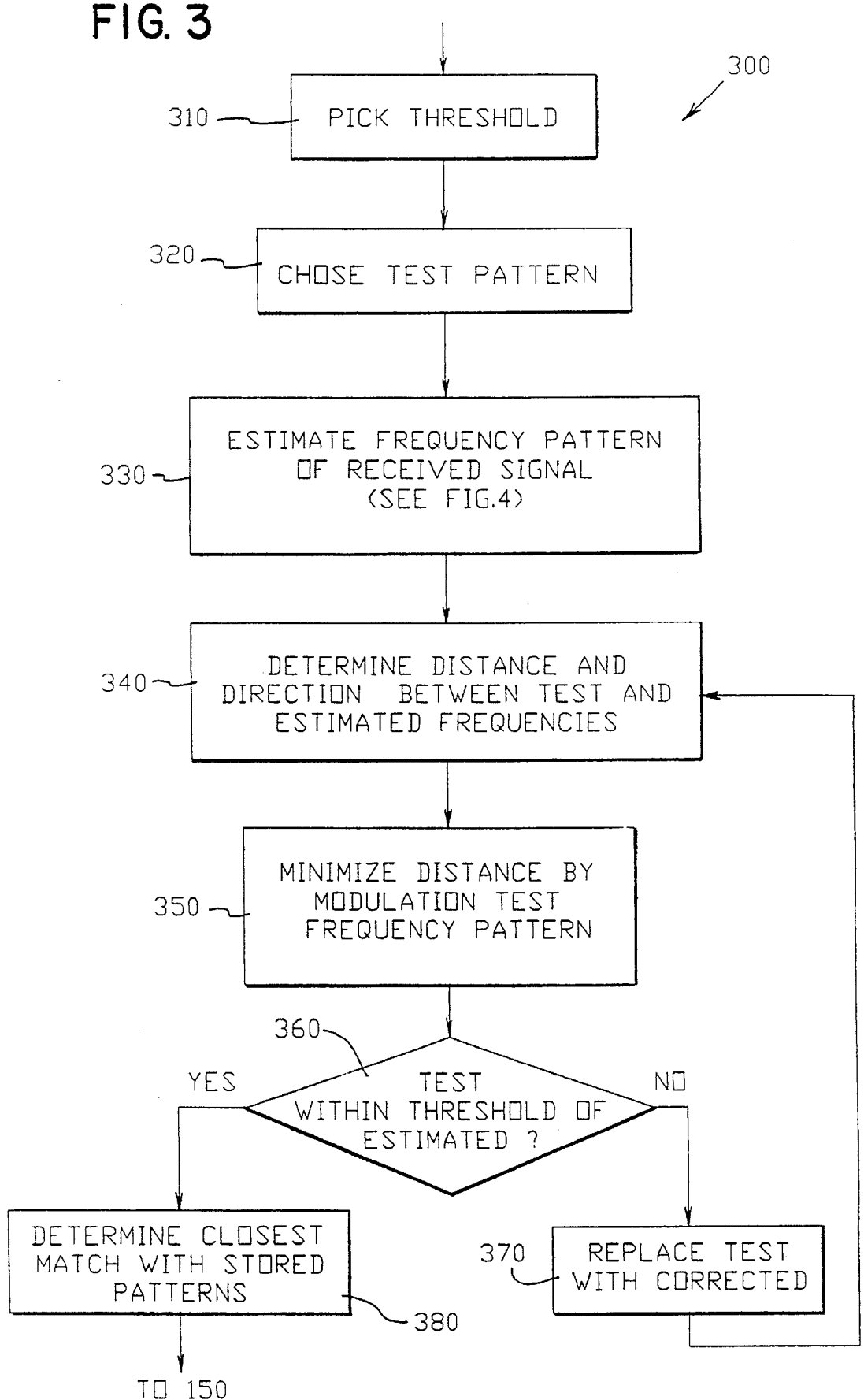
FIG. 3 is a flow chart showing the steps of a preferred embodiment for comparing a received frequency pattern to a stored representative subset of frequency patterns.

A preferred embodiment uses one such algorithm 300, as shown in FIG. 3 and described below:

First a threshold value is picked 310. The threshold value determines the desired frequency accuracy. For example, if a numerical accuracy desired for the frequencies is $10^{-6}$, the threshold is set 310 at THRESHOLD=$10^{-6}$.

Next a test pattern is chosen 320. Preferably, the test pattern will be a member of the frequency pattern set. The chosen test pattern is designated as $\hat{\Omega}_0$.

Next an estimate of the amplitude and phase parameters for all P frequencies that comprise the frequency pattern of the received signal is made 330. This is done by estimating and removing the indeterministic noise components of the received signal and assuming that the received signal contains the test pattern frequencies $\hat{\Omega}_0$. This estimation and removal of noise, and subsequent estimation of the amplitudes and phase is performed in algorithm 400 described in FIG. 4 below.

Next a distance and direction (higher or lower, e.g. plus or minus) is determined 340 between the each respective frequency estimated in the received pattern and the each respective frequency in the test pattern. The compared frequencies have the same positions in their respective (estimated received and test) frequency patterns.

In a preferred embodiment, the distances and directions 340 are determined by computing a gradient as follows:

$$g_0 = \text{Grad } J(\hat{\Omega}_0)^T$$

where $J(\hat{\Omega}_0)^T$ is a measure of residual noise after the signal and indeterministic noise is remove, i.e., the distance between the actual signal and its estimate.

Grad $J(\hat{\Omega}_0)^T$ is a measure of the direction that the estimated signal has to change to better match the actual signal, and $g_0$ is gradient just defined.
Then set $$d_0 = -g_0$$

In the next step 350, $d_0$ is used in an iteration to change the test frequency pattern until the distance between the test frequency pattern and the estimated received frequency pattern is a minimum. In order to do this, each frequency of the test pattern may be modified to decrease the distance, J, for each iteration. That is to say:
For k=0, ..., P-1,
Set $$\hat{\Omega}_{k+1} = \hat{\Omega}_k + \alpha_k d_k$$

where $\alpha_k$ is a factor multiplying the gradient (direction) between respective frequencies in the test and estimated received frequency pattern that is chosen to minimize the distance in the next iteration. More specifically, for each iteration, the new distance represented by $$J(\hat{\Omega}_k + \alpha_k d_k)$$

is determined by the new test frequency pattern, $(\hat{\Omega}_{k+1})^T$. The new distance is the distance between the estimated received frequency pattern and the new test frequency pattern. In a preferred embodiment, this new distance is determined by computing $$g_{k+1} = \text{Grad } J(\hat{\Omega}_{k+1})^T$$

This iteration is repeated for each of the frequencies in the frequency pattern. More specifically, If k<P-1, set (the new estimated gradient for those respective frequency positions) as follows:

$$d_{k+1} = -g_{k+1} + ((g_{k+1}^T g_{k+1})/(g_k^T g_k)) d_k$$

In step 360, a determination is made as to whether the new test frequency pattern, with all its composite frequencies having gone through an iteration, is at a distance from the estimated received frequency pattern that is within the chosen threshold. If it is, the selection in step 380 is made. If it is not, go to 370.

In a preferred embodiment, the following test is performed in step 360:

IF $J(\hat{\Omega}_p)$<THRESHOLD, go to 380, otherwise go to 370.

In step 370, it is determined that the distance from the estimated received frequency pattern to the chosen test pattern 320 is not within the threshold 310 and a new test pattern is chosen 370 by replacing the test with a corrected test pattern that was determined in step 350, $\hat{\Omega}_p$. Here $\hat{\Omega}_p$ is the test pattern with all its constituent frequencies modified if it was necessary.
Specifically,
Replace $\hat{\Omega}_0$ by $\hat{\Omega}_p$
returning to step 340.

In step 380, it has been determined that the chosen frequency pattern 320, after being modified by the iteration (340–370), is within the threshold 310. In this case, $\Omega_j$ from j=1, ..., P, is chosen from the stored frequency pattern set that is the closest match to $\hat{\Omega}_p$. In a preferred embodiment the closest match is determined by the minimum sum of the absolute valued of the differences of the respective frequencies.

When the closest frequency pattern is found 380, step 150 of algorithm 100 identifies this pattern obtained in 380 with the object associated with the pattern.

Figure 4:
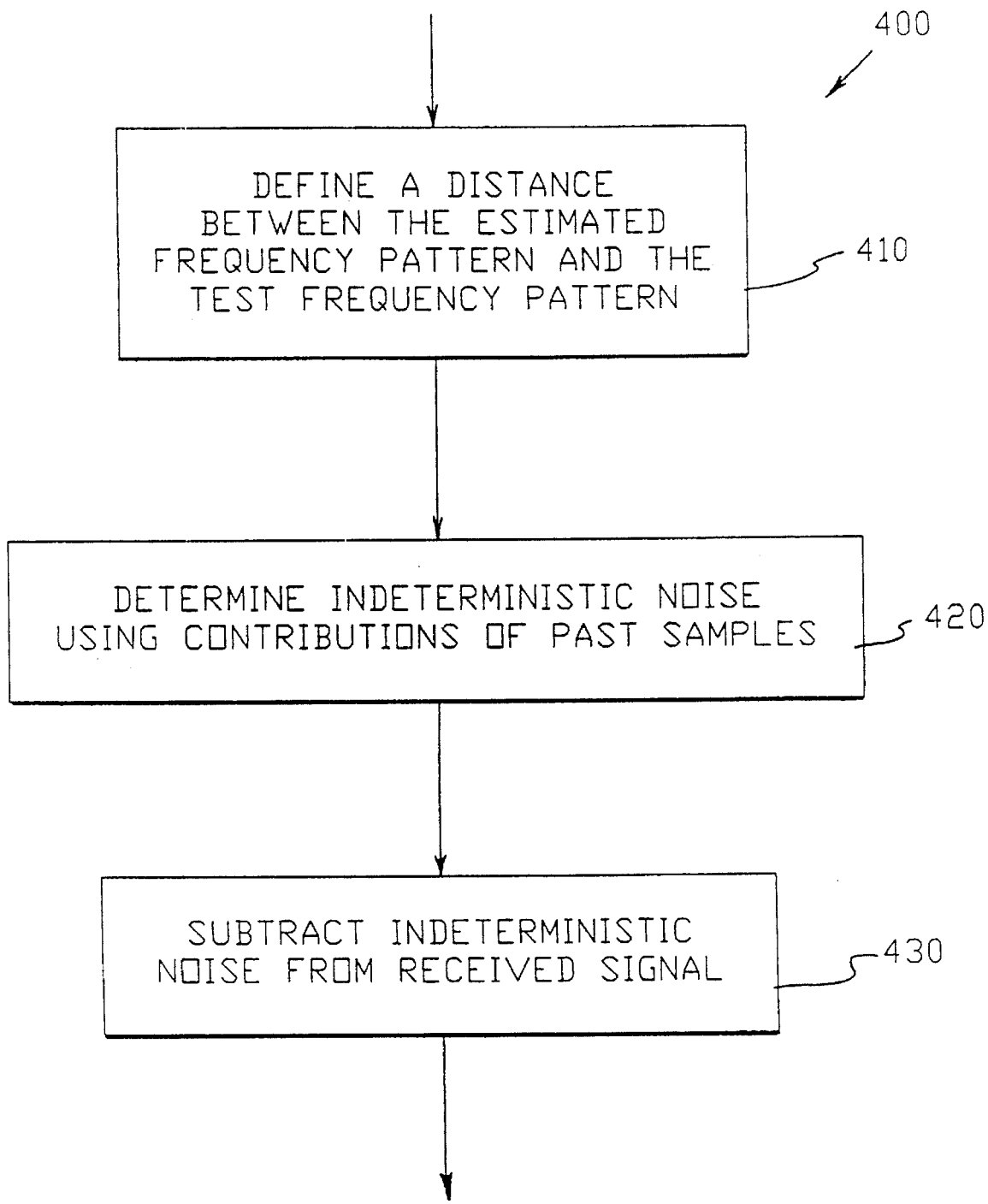
FIG. 4 is a flow chart showing the steps of a preferred embodiment for removing indeterministic noise.

FIG. 4 is a flow chart showing the steps of removing indeterministic noise. The algorithm 400 which identifies and removes the indeterministic noise from the received signal and estimates the amplitude and phase of the received signal's frequencies is described below:

Some relevant notation describing the physical feature of the embodiment is now defined. Let the received signal be represented by y(n). This signal can be represented as a sum of two components, a deterministic part h(n), composed of the desired frequency pattern, and an indeterministic part w(n), composed of undesirable noise.

Therefore, the signal received by the station 210 can be represented by:

$$y(n)=h(n)+w(n)$$

In this representation, w(n) can be described as an autoregressive process, as described in prior art. For a description see the book *Spectral Analysis and Time Series*, by M. B. Priestley. Hence, $$w(n)=-\Sigma b(k)w(n-k)+u(n)$$

where w(n), the indeterministic part of the received signal, can be viewed as a linear combination of its past samples with an additional term u(n), which is a white Gaussian noise process, with variance $\sigma^2$ The coefficients b(k) are called autoregressive parameters. Thus, knowledge of the b(k)'s and the variance $\sigma^2$ defines the indeterministic noise process w(n). Thus the b(k)'s represent the contribution of each respective past sample of the received signal and the variance is measure of the variation of the Gaussian noise, u(n), about its mean. The mean is assumed to be zero.

For a given number of samples in the received signal, denoted by T, and a given number, M, of autoregressive parameters b(k), the received signal y, can be represented as $$y=[y(M) \ldots y(T-1-M)]^T$$

and u, the Gaussian noise, can be represented as $$u=[u(M) \ldots u(T-1-M)]^T$$

$$Y = \begin{bmatrix} y(M-1) & \ldots & y(0) \\ y(M) & \ldots & y(1) \\ . & \ldots & . \\ . & \ldots & . \\ . & \ldots & . \\ y(T-M-2) & \ldots & y(T-1-2M) \end{bmatrix}$$

$$E_h = \begin{bmatrix} e^{j2M\pi\omega_1} & \ldots & e^{j2M\pi\omega_P} \\ . & \ldots & . \\ . & \ldots & . \\ . & \ldots & . \\ e^{j2(T-1-M)\pi\omega_1} & \ldots & e^{j2(T-1-M)\pi\omega_P} \end{bmatrix}$$

Defining a function J, as a distance measure 340, as $$J=\|y-Yb-E_h\mu\|^2$$

The purpose of the method 400 is to determine the parameters, b, of the auto regressive process to quantify the indeterministic noise and then to subtract the effect of the indeterministic noise from the received signal and to determine the amplitude and phase of the frequency in the received signal. In a preferred embodiment this is done is step 330.

For a given frequency pattern $\Omega$, determine 410 the function J using the following expressions:

$$P_{Eh}=I-E_h(E_h^H E_h)^{-1}E_h^H$$

$$P_y-P_{Eh}-P_{\{Eh\}}Y(Y^H P_{Eh}Y)^{-1}Y^H P_{Eh}$$

$$J=\|P_y y\|^2$$

Now, determine 420 the autoregression parameters b (representing the contribution of each of the past samples) of the indeterministic noise w(n) by $$b=[Y^H P_{Eh}Y]^{-1}Y^H P_{Eh}y$$

Once the indeterministic noise is determined (steps 410 and 420), compute the amplitude and phase of the frequencies in the received signal. In a preferred embodiment this is given by $$\mu=[E_h^H P_{Eh}E_h]^{-1}E_h^H P_{Eh}(y-Yb)$$

Now, $$C_i=\mu_i\Sigma b(k)e_i^{-j2k\&pi\omega}$$

The values $C_i$ are complex numbers representing the amplitude and phase of each frequency $\omega_i$ in the received signal.

In this step, the indeterministic noise is subtracted out of the received signal.

FIG. 5 illustrates a wireless local area network that is a preferred embodiment of the present invention. This system 500 consists of base stations 520,530, connected through a local area network 560. A network server 510 may be also part of the local area network. Each base station, e.g., 520, communicates with one or more remote stations 540, 550 using a wireless access method (e.g. radio frequencies, infrared frequencies). Such techniques are extensively described in the literature. In a number of these wireless access techniques, data transmission is accomplished digitally, as packets of data, modulated on carrier frequencies. In order to determine the nature of the wireless transmission medium and to compensate for its effects, it is common to include a header message in each packet, which is a known unique signal. A receiver may receive this signal, and determine its frequency, amplitude and phase content. This information can be used to derive information regarding the transmission medium. Algorithm 100 describes such a method, and can be used for this purpose.

Figure 6:
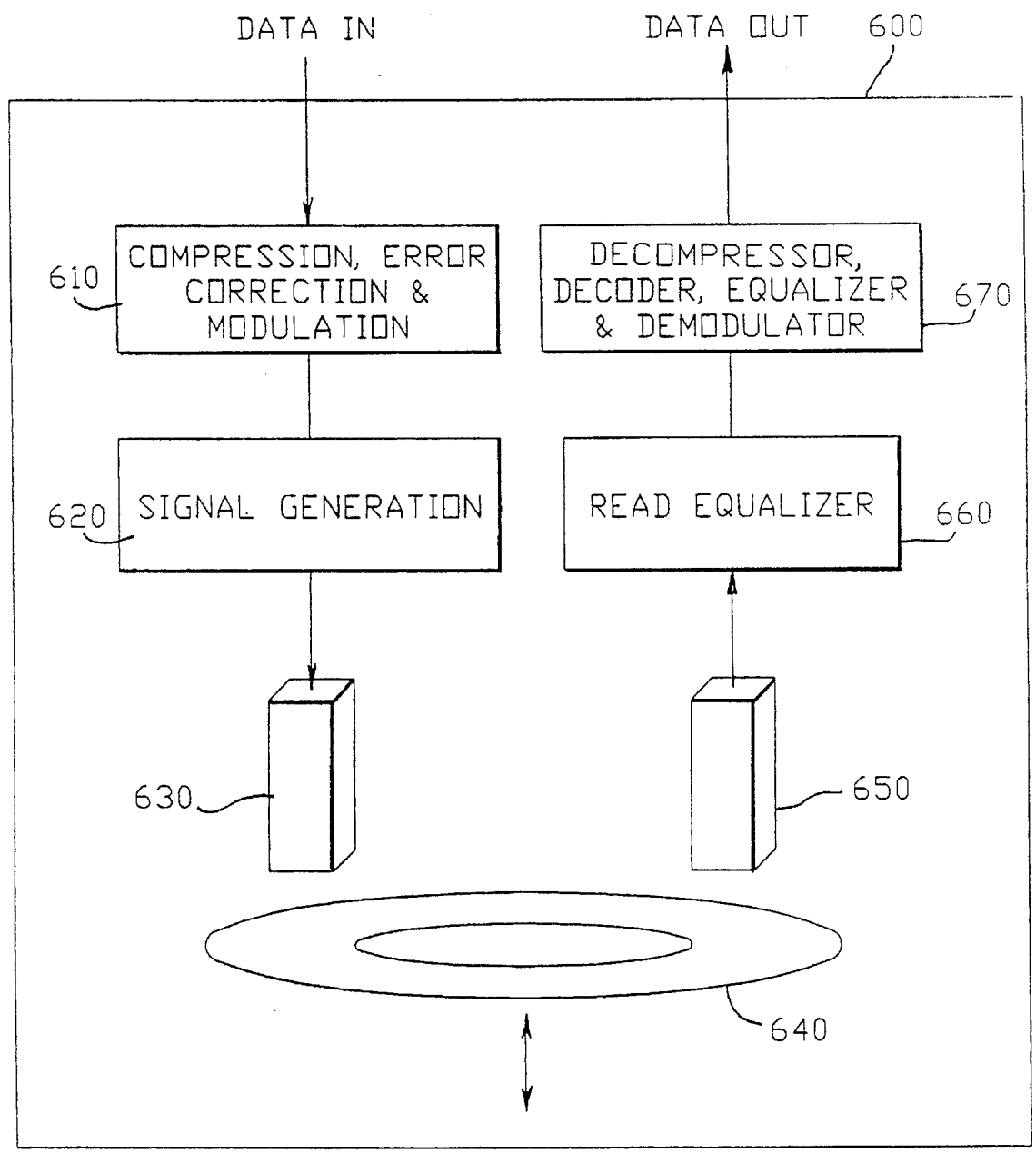
FIG. 6 is a block diagram of a magnetic recording device using the present invention to filter noise and detect recorded information.

FIG. 6 illustrates a magnetic recording system 600 that is a preferred embodiment of the present invention. Here, data is compressed, encoded and modulated in 610, and a suitable signal is then generated and recorded onto the recording medium 640 using a recording head 630. In some magnetic recording systems, pilot tones comprising specific unique frequencies are also recorded on the recording medium. These tones may subsequently be used to provide position and track information on the recording medium. In order to read information from the recording medium, a read head 650 is used. The signal at the output of this head is equalized in 660, and passed onto 670, where the signal is demodulated, equalized, decoded and decompressed, thereby reversing the actions in 610. The process of equalization requires specific information regarding position and track information, as well as information regarding the characteristics of the magnetic recording medium. With the use of pilot tones embedded in the signal, we may employ algorithm 100 to extract these tones, as well as the media's characteristics.

Given this disclosure, one skilled in the art could develop other equivalent frequency tagging application using this novel system and method that are within the contemplation of the invention.

I claim:

1. A method for a transceiver to identify objects by recognizing one or more frequency pattern tags, the method comprising the steps of:

defining a set of unique frequency patterns, each said unique frequency pattern comprising a set of at least two different frequencies, each frequency pattern in the set uniquely tagging an object that transmits its respective frequency pattern tag, the object being in a set of one or more objects;

storing the set of unique frequency patterns in a memory of the transceiver;

transmitting a frequency pattern tag to the transceiver by one or more of the objects;

estimating the frequency pattern of the received signal;

comparing the estimated frequency pattern to a selected test frequency pattern to determine a distance between the estimated frequency pattern and the test frequency pattern;

modifying the test frequency pattern to minimize the distance to a final test frequency pattern that is developed by the modifications;

selecting one stored pattern from the stored set that has the shortest distance to the final test frequency pattern, the selected stored pattern being that tag of an object that is selected as the object transmitting the tag.

2. A method, as in claim 1, where the indeterministic noise is removed from the transmitted signal before the comparison is made.

3. A system for identifying transmitting objects, comprising:

a. a base station with a computer having memory storage, a central processing unit, and a transceiver adapter;

b. one or more remote objects that transmit a unique frequency pattern tag;

c. an algorithm, executed by the central processing unit comprising the following steps:

defining a set of unique frequency patterns, each said unique frequency pattern comprising a set of at least two different frequencies, each frequency pattern in the set uniquely tagging an object that transmits its respective frequency pattern tag, the object being in a set of one or more objects;

storing the set of unique frequency patterns in a memory of the transceiver;

transmitting a frequency pattern tag to the transceiver by one or more of the objects;

estimating the frequency pattern of the received signal;

comparing the estimated frequency pattern to a selected test frequency pattern to determine a distance between the estimated frequency pattern and the test frequency pattern;

modifying the test frequency pattern to minimize the distance to a final test frequency pattern that is developed by the modifications;

selecting one stored pattern from the stored set that has the shortest distance to the final test frequency pattern, the selected stored pattern being that tag of an object that is selected as the object transmitting the tag.

4. A wireless local area network, comprising:

a. a server comprising a computer with a storage memory, a central processing unit;

b. one or more stations each comprising a computer and transmitting information to the server with a frequency pattern tag;

c. a LAN connection, connecting server and the station for carrying the transmitted tags;

c. an algorithm, executed by the server central processing unit, further comprising the steps of:

defining a set of unique frequency patterns, each said unique frequency pattern comprising a set of at least two different frequencies, each frequency pattern in the set uniquely tagging an object that transmits its respective frequency pattern tag, the object being in a set of one or more objects;

storing the set of unique frequency patterns in a memory of the transceiver;

transmitting a frequency pattern tag to the transceiver by one or more of the objects;

estimating the frequency pattern of the received signal;

comparing the estimated frequency pattern to a selected test frequency pattern to determine a distance between the estimated frequency pattern and the test frequency pattern;

modifying the test frequency pattern to minimize the distance to a final test frequency pattern that is developed by the modifications;

selecting one stored pattern from the stored set that has the shortest distance to the final test frequency pattern, the selected stored pattern being that tag of an object that is selected as the object transmitting the tag.

5. A magnetic recording system comprising:

a. a computer for monitoring information from the output of a recording head, the computer having a memory storage and a central processing unit;

b. a magnetic recording media having frequency pattern tags indicating information about the recording media;

c. an algorithm, executed by the central processing unit, comprising the steps of:

defining a set of unique frequency patterns, each said unique frequency pattern comprising a set of at least two different frequencies, each frequency pattern in the set uniquely tagging an object that transmits its respective frequency pattern tag, the object being in a set of one or more objects;

storing the set of unique frequency patterns in a memory of the transceiver;

transmitting a frequency pattern tag to the transceiver by one or more of the objects through the head;

estimating the frequency pattern of the received signal;

comparing the estimated frequency pattern to a selected test frequency pattern to determine a distance between the estimated frequency pattern and the test frequency pattern;

modifying the test frequency pattern to minimize the distance to a final test frequency pattern that is developed by the modifications;

selecting one stored pattern from the stored set that has the shortest distance to the final test frequency pattern, the selected stored pattern being that tag of an object that is selected as the information transmitting the tag.

* * * * *